United States Patent
Sugiyama et al.

(10) Patent No.: US 8,234,059 B2
(45) Date of Patent: Jul. 31, 2012

(54) NAVIGATION DEVICE

(75) Inventors: Shinji Sugiyama, Shinagawa-ku (JP);
Minako Fujishiro, Ota-ku (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 372 days.

(21) Appl. No.: 12/532,714

(22) PCT Filed: Mar. 19, 2008

(86) PCT No.: PCT/JP2008/055068
§ 371 (c)(1),
(2), (4) Date: Sep. 23, 2009

(87) PCT Pub. No.: WO2008/117712
PCT Pub. Date: Oct. 2, 2008

(65) Prior Publication Data
US 2010/0114471 A1  May 6, 2010

(30) Foreign Application Priority Data
Mar. 26, 2007  (JP) .................................. 2007-079712

(51) Int. Cl.
*G01C 21/00*  (2006.01)
(52) U.S. Cl. ............ 701/200; 701/25; 701/26; 701/400; 701/410; 701/411; 701/413; 701/418; 340/995.1; 340/995.14; 340/995.16; 340/995.19; 340/995.21; 345/156
(58) Field of Classification Search .......... 340/988–996; 701/200–215
See application file for complete search history.

(56) References Cited

U.S. PATENT DOCUMENTS

| | | | |
|---|---|---|---|
| 6,249,740 B1 * | 6/2001 | Ito et al. ......................... | 701/420 |
| 6,263,278 B1 * | 7/2001 | Nikiel et al. .................. | 701/533 |
| 6,909,967 B2 * | 6/2005 | Hirano et al. ................. | 701/410 |
| 7,142,205 B2 * | 11/2006 | Chithambaram et al. .... | 345/418 |
| 8,145,416 B2 * | 3/2012 | Wailes et al. .............. | 340/995.1 |
| 2004/0054428 A1 * | 3/2004 | Sheha et al. .................... | 700/56 |
| 2007/0156335 A1 * | 7/2007 | McBride et al. ............. | 701/209 |

FOREIGN PATENT DOCUMENTS

| | | |
|---|---|---|
| EP | 1 357 359 A1 | 10/2003 |
| JP | 8 247776 | 9/1996 |

(Continued)

OTHER PUBLICATIONS

Extended Search Report issued Sep. 5, 2011, in European Patent Application No. 08722455.6-1236/2131150.

*Primary Examiner* — Jonathan M Dager
(74) *Attorney, Agent, or Firm* — Oblon, Spivak, McClelland, Maier & Neustadt, L.L.P.

(57) ABSTRACT

A navigation device 100 having a function to modify a route comprises an operational object detecting part 11 configured to detect a point or a section on the route as an operational object, a fixed point setting part 12 configured to set as fixed points two points on the route sandwiching the operational object therebetween, an operational object displacement detecting part 13 configured to detect a displacement of the operational object, a path changing part 14 configured to change a path of the route depending on the displacement of the operational object while elongating or contracting a line connecting the operational object and the fixed point, and a route re-searching part 15 configured to re-search and display an alternate route continuously depending on the changing path.

8 Claims, 7 Drawing Sheets

FOREIGN PATENT DOCUMENTS

| | | |
|---|---|---|
| JP | 11 37782 | 2/1999 |
| JP | 2000 111354 | 4/2000 |
| JP | 2000 283783 | 10/2000 |
| JP | 2001 74481 | 3/2001 |
| JP | 2001 91283 | 4/2001 |
| JP | 2001 296134 | 10/2001 |
| JP | 2002 304256 | 10/2002 |
| JP | 2007 3328 | 1/2007 |

* cited by examiner

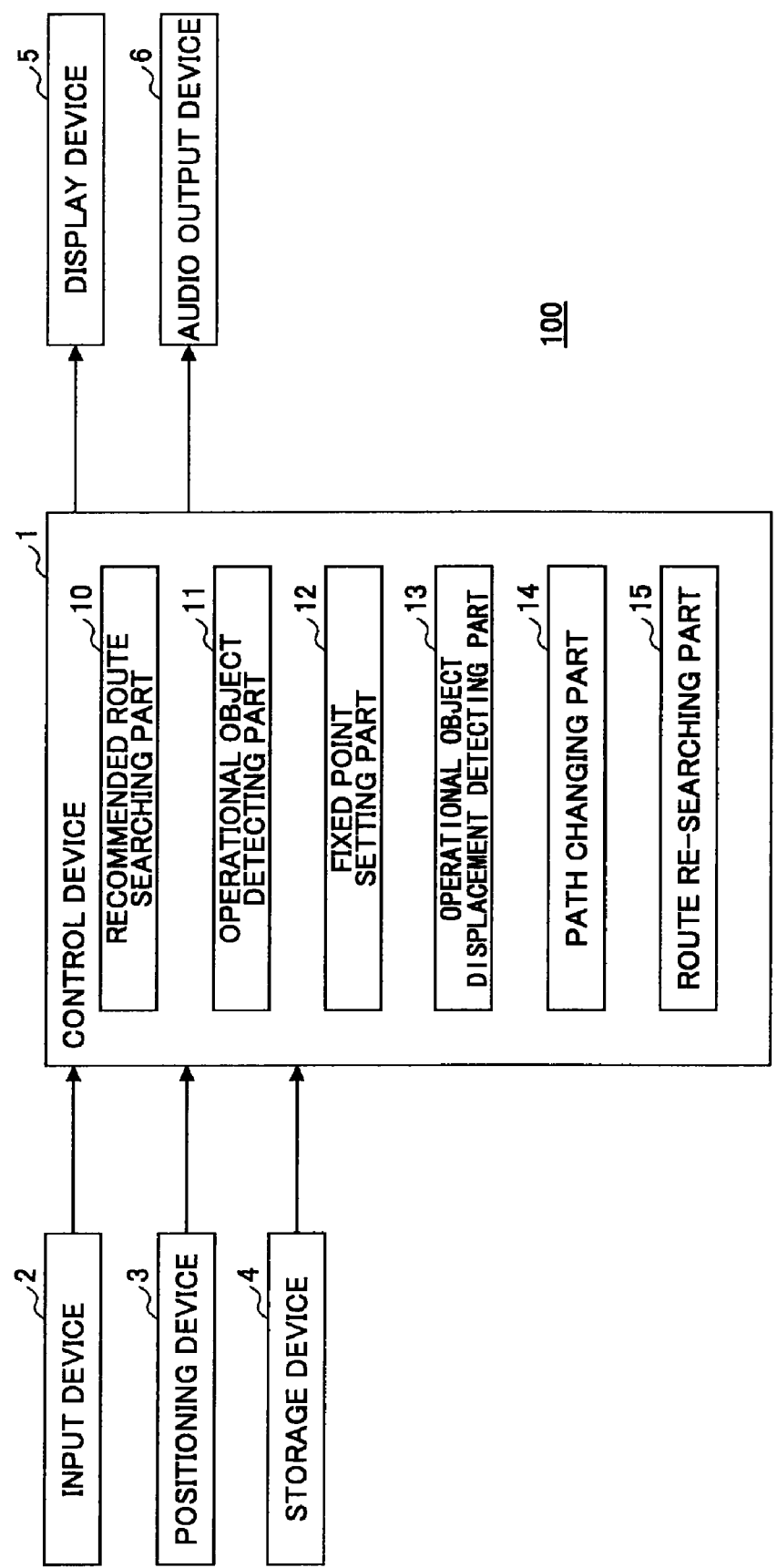

NAVIGATION DEVICE

TECHNICAL FIELD

The present invention relates to a navigation device having a function to modify a recommended route which has been searched, in particular, to a navigation device allowing an operator to modify the recommended route through an intuitive and simple operation.

BACKGROUND ART

Conventionally, a navigation device including node indicating means and re-searching means is known (see Patent Document 1). In order for an operator to modify through the use of a touch panel a portion of a recommended route which has already been searched, the node indicating means allow the operator to touch-input a node such as an intersection on the recommended route (hereinafter called "a previous node") and allow the operator to move the previous node to another node such as another intersection displayed on a map (hereinafter called "a new node") by use of a drag and drop operation. The re-searching means re-search an alternate recommended route so that the alternate recommended route can pass through the new node.

An information processor allowing an operator to modify a portion of a recommended route is also known (see Patent Document 2). To this end, through the use of a touch panel, the information processor allows the operator to designate as fixed points two points on a recommended route which has already been searched, allows the operator to pinch a line segment included in a portion of the already searched recommended route between the two fixed points with his thumb and his forefinger, and allows the operator to move the pinched line segment by use of a drag and drop operation.

A map information display device is also known (see Patent Document 3). Through use of a click ball mechanism, the map information display device allows an operator to move a destination point which has already been set by use of a drag and drop operation.

A navigation device which allows an operator to draw by hand through the use of a touch panel a line including two points on an already searched recommended route and re-searches a route along the drawn line so that the route can form a portion of the recommended route is also known (see Patent Document 4).

[Patent Document 1] Japanese Patent Publication No. 2007-3328
[Patent Document 2] Japanese Patent Publication No. 2002-304256
[Patent Document 3] Japanese Patent Publication No. 2001-296134
[Patent Document 4] Japanese Patent Publication No. 2001-74481

DISCLOSURE OF THE INVENTION

Problems to be Solved by the Invention

However, Patent Documents 1-4 make no reference to a dynamic change of the representation of the recommended route while the operator is modifying a portion of the recommended route.

Usability of a navigation device while modifying a recommended route is useful in preventing an erroneous operation or a lengthy operation time. For instance, if there is no change on a screen between a time when an operator has selected the previous node and a time when the navigation device displays a re-search result of a recommended route on the screen, the operator can not know what the navigation device is currently doing or which operation the navigation device has accepted. Thus, because of such unwieldiness, the operator may avoid the use of a function to modify the recommended route.

In view of the above-mentioned problems, it is an object of the present invention to provide a navigation device allowing an operator to modify a recommended route through a more intuitive and simpler operation and through representations on a screen.

Means for Solving Problems

To achieve the object above, a navigation device according to a first embodiment of the invention is a navigation device having a function to modify a route, including an operational object detecting part configured to detect a point or a section on the route as an operational object, an operational object displacement detecting part configured to detect a displacement of the operational object, a path changing part configured to change a path of the route depending on the displacement of the operational object, and a route re-searching part configured to re-search and display an alternate route based on the changing path.

According to a second embodiment of the invention, there is provided a navigation device according to the first embodiment of the invention, further including a fixed point setting part configured to set as fixed points two points on the route sandwiching the operational object therebetween, wherein the path changing part elongates or contracts a line connecting the operational object and the fixed points in conjunction with the displacement of the operational object.

According to a third embodiment of the invention, there is provided a navigation device according to the second embodiment of the invention, wherein the fixed point includes a departure point, a destination point, an edge point of the route displayed on a screen, or a turning point on the route.

According to a fourth embodiment of the invention, there is provided a navigation device according to one of the first to the third embodiments of the invention, wherein the operational object is designated by one or more points on the route.

According to a fifth embodiment of the invention, there is provided a navigation device according to one of the first to the fourth embodiments of the invention, wherein the operational object displacement detecting part detects the displacement of the operational object based on a drag operation of the operational object.

According to a sixth embodiment of the invention, there is provided a navigation device according to one of the first to the fifth embodiments of the invention, including at least one of a touch panel, a touch pad, a mouse, a track ball, a joystick, or a remote control with an arrow key.

According to a seventh embodiment of the invention, there is provided a navigation device according to one of the first to the sixth embodiments of the invention, wherein the path changing part displays a path changing depending on the displacement of the operational object, continuously.

A navigation device according to an eighth embodiment of the invention is a navigation device having a function to modify a route, including an operational object detecting part configured to detect a point or a section outside the route as an operational object, a fixed point setting part configured to set as fixed points two points on the route sandwiching the operational object therebetween, and a route re-searching part configured to re-search and display an alternate route including the operational object and the two fixed points.

Effect of the Invention

According to the means above, it is possible for the present invention to provide a navigation device allowing an operator to modify a recommended route through a more intuitive and simpler operation and through representations on a screen.

BRIEF DESCRIPTION OF THE DRAWINGS

FIG. 1 is a block diagram illustrating an embodiment of a navigation device according to the present invention.

Figure 2A:
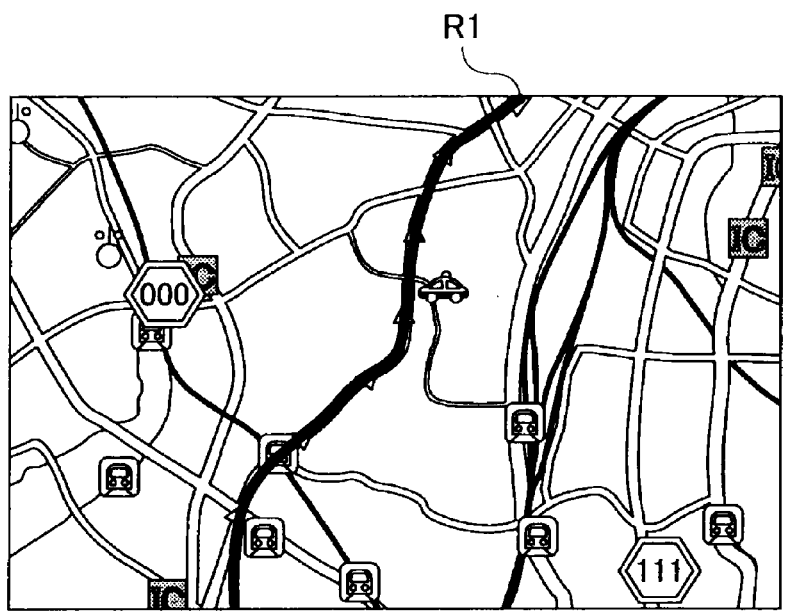
FIGS. 2A to 2C are illustrations of a process where a recommended route is re-searched.

EXPLANATION OF REFERENCE SIGNS 1 control device
2 input device
3 positioning device
4 storage device
5 display device
6 audio output device
10 recommended route searching part
11 operational object detecting part
12 fixed point setting part
13 operational object displacement detecting part
14 path changing part
15 route re-searching part
100 navigation device
B1-B3 modified route
F1-F6 anchor
P1-P7 operational object
R1-R3 recommended route
T1-T6 path

BEST MODE FOR CARRYING OUT THE INVENTION

With reference to the figures, a description of the best mode for carrying out the present invention is given below.

First Embodiment

FIG. 1 is a block diagram illustrating an embodiment of a navigation device 100 according to the present invention. For example, the navigation device 100 is an in-car device which displays a route to a destination. The navigation device 100 includes a control device 1, an input device 2, a positioning device 3, a storage device 4, a display device 5, and an audio output device 6.

The control device 1 is a computer which includes a CPU (Central Processing Unit), a RAM (Random Access Memory), a ROM (Read Only Memory), or the like. For example, programs corresponding respectively to a recommended route searching part 10, an operational object detecting part 11, a fixed point setting part 12, an operational object displacement detecting part 13, a path changing part 14, and a route re-searching part 15 may be stored in the ROM, and the CPU executes a process corresponding to each part.

The input device 2 is a device for inputting a variety of information into the navigation device 100. For example, the input device 2 may be a device enabling both a coordinate input and a drag operation (an operation for displacing an object as if dragging the object while holding it), such as a touch panel (an input device arranged on a display), a touch pad (an input device arranged physically away from a display), a mouse, a track ball, a remote control with an arrow key, a joystick, or the like.

The positioning device 3 is a device for determining a position of a vehicle. For example, the positioning device 3 receives by use of a GPS (Global Positioning System) receiver a GPS signal outputted by a GPS satellite through a GPS antenna, and determines a position of a vehicle based on the received signal. The determination by the positioning device 3 may be achieved in any manner such as by point positioning or by relative positioning (including phase relative positioning). Preferably, relative positioning with higher precision is used. In this case, the determined position of the vehicle may be corrected based on an output of a variety of sensors such as a steering angle sensor, a vehicle speed sensor, a gyro sensor, or the like, or based on a variety of information received through a beacon receiver or a FM multi receiver.

The storage device 4 is a device for storing a variety of information required for the navigation device 100. For example, the storage device 4 stores a map information database which systematically stores a node such as an intersection or an interchange, a link distance (a link is an element for connecting nodes), a link direction, a link cost (an amount of time or an amount of tollage for passing through a link), a position of a building (latitude, longitude, altitude), or others.

The display device 5 is a device for displaying a variety of information. For example, the display device 5 may be a liquid crystal display, an organic electro luminescent display, or the like which displays a navigation screen.

The audio output device 6 is a device for audio outputting a variety of information. For example, the audio output device 6 may be an in-car speaker or the like which audio outputs an audio message relating to a route guide at a predetermined timing.

Next is an explanation of each part in the control device 1.

The recommended route searching part 10 is a part for deriving an optimal route from a predetermined position (for example, a current position of a vehicle) to a destination based on a vehicle position (latitude, longitude, altitude) determined by the positioning device 3, position information (latitude, longitude, altitude) of the destination inputted via the input device 2, and the information stored in the map information database stored in the storage device 4. For example, the recommended route searching part 10 searches a shortest route by using the Dijkstra method as a shortest route search algorithm. The recommended route searching part 10 may search a fastest route to reach the destination, a route to avoid using a turnpike, or the like, other than the shortest route.

The recommended route searching part 10 also displays a searched recommended route on the screen of the display device 5 so that an operator can discern the recommended route from other routes, thereby the operator can easily recognize the recommended route. The recommended route searching part 10 also audio outputs an audio assist along the recommended route from the audio output device 6 so that the recommended route searching part 10 can assist driving by the operator's listening to the audio assist.

The operational object detecting part 11 is a part for detecting a position of an operational object used for changing a path of a recommended route which has been displayed on the display device 5 by the recommended route searching part 10.

Herein, "an operational object" stands for a handle used for changing a path of a route (for example, an operational point which is set on graphics or lines for changing a shape of the graphics, or lengths, directions, or curvatures of the lines, in a graphic drawing software). The navigation device 100 changes a path of a route in real time according to a drag operation of the operational object. The operational object may be a point on the route or a section having a predetermined length.

In an example, if a coordinate position on a route is touch-inputted by an operator via the input device 2 (a touch panel), the operational object detecting part 11 detects the touch-inputted coordinate position as a coordinate position of an operational object.

The operational object detecting part 11 may also blink or highlight the detected coordinate position on the display device 5 so that the operator can discern the detected coordinate position as the operational object.

If an operator touch-inputs two points on a route, the operational object detecting part 11 detects a section existing between those two points as an operational object. In addition, the operational object detecting part 11 may blink or highlight the section on the display device 5 so that the operator can discern the section as the operational object.

If an operator touch-inputs a coordinate position located outside of a route and then moves the coordinate position through a drag operation so that the coordinate position crosses the route at a coordinate position on the route, the operational object detecting part 11 detects the crossed point as the coordinate position of the operational object. In this way, the operator can select the operational object without accurately touch-inputting a coordinate position on the route.

The operational object detecting part 11 can also be used to detect as an operational object a coordinate position located outside of a route and selected by an operator through a touch-input, or a section located outside of the route and selected by an operator through a drag operation.

The fixed point setting part 12 is a part for setting a fixed point (hereinafter called "an anchor"). The anchor separates a section where a path of a route changes from a section where a path of a route does not change. In an example, the fixed point setting part 12 sets the coordinate position of an anchor based on the coordinate position of an operational object detected by the operational object detecting part 11.

"Anchors" corresponds to two points on a route which sandwich a coordinate position of an operational object therebetween. For example, an anchor includes an edge point of a route displayed on a screen of the display device 5 (an edge point of a route which ends at the edge of the screen due to a screen size limitation), a turning point (a point where a route turns to left or right without following a road at a branching point such as an intersection, a T-intersection, or a Y-intersection), a destination point, a departure point (for example, a current position), or the like.

In an example, the fixed point setting part 12 selects as anchors two coordinate positions out of coordinate positions of an edge point, a turning point, a destination point, a departure point, or the like. The fixed point setting part 12 selects the two coordinate positions that are closest to an operational object detected by the operational object detecting part 11 and so as to sandwich the operational object therebetween.

The operational object displacement detecting part 13 is a part for detecting a displacement of an operational object. For example, if an operational object detected by the operational object detecting part 11 is moved on a screen of the display device 5 via a drag operation, the operational object displacement detecting part 13 detects a displacement (including a moving distance, a moving direction, a moving speed, a coordinate position after the movement, or the like) of the operational object.

The path changing part 14 is a part for changing a path of a route displayed on the display device 5. For example, if an operational object is moved through a drag operation, the path changing part 14 displays on the display device 5 a new path while elongating or contracting a line which connects the operational object to each anchor. The path changed by the path changing part 14 is a tentative path, in the sense that a path changed by the path changing part 14 will usually not correspond to a path of a route to be re-searched.

The path changing part 14 may also display on the display device 5 a path which connects an operational object and anchors with a straight line (for example, a path drawn by an imaginary rubber band or an imaginary string strained between two anchors when the rubber band or the string is pulled or pushed from right to left or up to down). The path changing part 14 may also display on the display device 5 a path which connects an operational object and anchors with a curved line (for example, a path where a deviation from an original route reaches a maximum at a coordinate position of an operational object which is moved through a drag operation whereas the deviation from the original route lessen gradationally with distance from the coordinate position of the operational object).

The path changing part 14 may also change a width of a line representing a path with distance between an operational object and an anchor so that the width of the line gets thinner as the distance gets larger (as the deviation from the original route gets larger). This is because, by displaying a line representing the path which gets thinner just like a rubber band or a string gets thinner when stretched, the path changing part 14 enables an operator to understand the degree of deviation from the original route intuitively.

The route re-searching part 15 is a part for re-searching a route which has already been searched by the recommended route searching part 10. For example, based on a path changed by the path changing part 14, the route re-searching part 15 re-searches and displays a route including an approximation of the changed path. It will be assumed that re-searching of a route based on a path changed by the path changing part 14 includes re-searching a route based only on a current coordinate position of an operational object (regardless of a shape of a path).

In an example, the route re-searching part 15 re-searches an alternate route which minimizes a degree of deviation relative to the thus changed path determined by the path changing part 14 (for example, the degree of deviation is represented by an average of distances between each coordinate position sampled at a predetermined interval on a re-searched route and the thus changed path determined by the path changing part 14 and displayed on the display device 5), or an alternate route which has the longest overlap section with a road including a point indicated by an operational object to the extent that a total distance of a re-searched route becomes less than a predetermined distance, or the like.

The route re-searching part 15 can also re-search an alternate route in consideration of a link cost such as a road category, a roadway width, state of congestion, or the like, just like a common search algorithm which the recommended route searching part 10 utilizes.

The route re-searching part 15 can also initiate a re-search of a route based on a path displayed on the display device 5 by the path changing part 14 when a drag operation is completed (i.e. when an operator lifts his finger off a touch panel).

The route re-searching part 15 can also display a re-searched route upon deleting an originally displayed recommended route, or may display a re-searched route while displaying the originally displayed recommended route.

The route re-searching part 15 can also re-search an alternate route based on an operational object detected by the operational object detecting part 11 by allowing an operator to touch-input a coordinate position located outside of a route or drag-input a section located outside of a route, and based on two fixed points on the route set by the fixed point setting part 12 so that those two fixed points sandwich the operational object therebetween, and then the display device 5 may display the re-searched alternate route thus re-searched by the route re-searching part 15.

This enables the navigation device 100 to re-search a route without the need of having the operational object displacement detecting part 13 detect a displacement of an operational object and without the need of having the path changing part 14 display a tentative path.

Figure 2B:
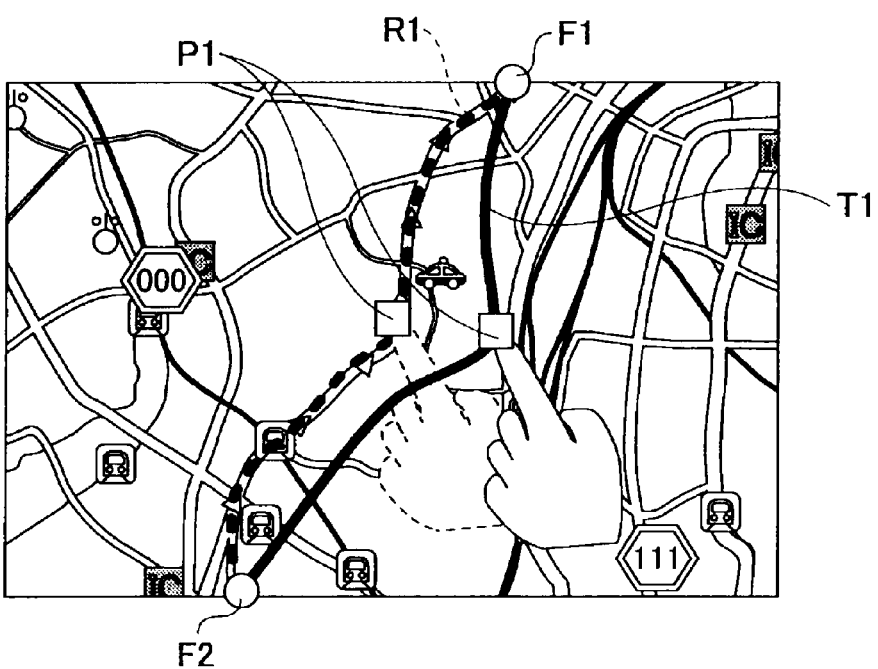
Figure 2C:
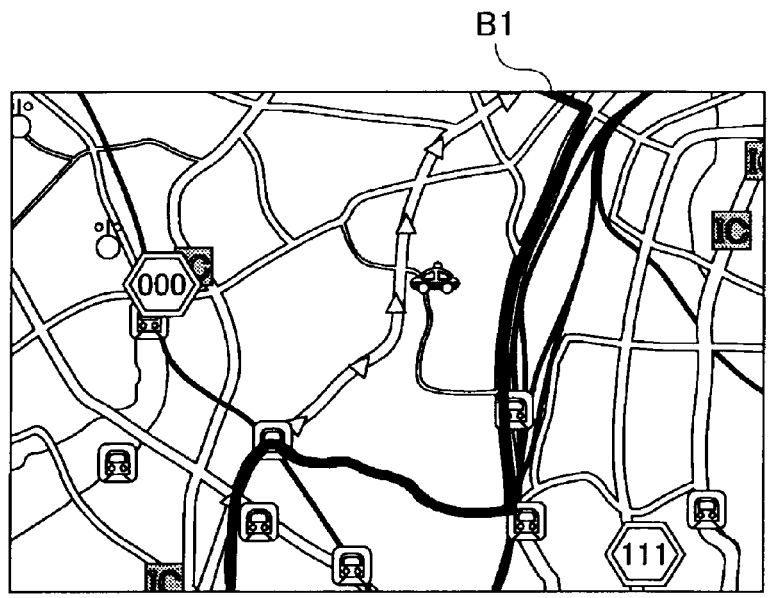

Next, with reference to FIGS. 2A to 2C, a process by which the navigation device 100 re-searches a portion of a recommended route is explained. FIGS. 2A to 2C illustrate a process in which a recommended route is re-searched. FIG. 2A illustrates a state of the display device 5 which displays an original recommended route R1 to be re-searched. FIG. 2B illustrates a state where the path changing part 14 has changed a path of the recommended route. FIG. 2C illustrates a state of the display device 5 which displays a re-searched recommended route B1 (herein after called "a modified route").

First, if an operator touch-inputs a coordinate position on the original recommended route R1 searched by the recommended route searching part 10, the navigation device 100 detects the coordinate position as an operational object P1 by the operational object detecting part 11, and then blinks or highlights the operational object P1.

Subsequently, the navigation device 100, by the fixed point setting part 12, sets as anchors two edge points F1 and F2 on the original recommended route R1 displayed on the screen of the display device 5 so that the navigation device 100 can change a path between the anchor F1 and the anchor F2.

Subsequently, the navigation device 100, by the operational object displacement detecting part 13, detects a displacement of the operational object P1 if an operator moves the operational object P1 through a drag operation. Then the navigation device 100, by the path changing part 14, changes a path of the recommended route between the anchor F1 and the anchor F2 in conjunction with the displacement of the operational object P1.

Subsequently, the navigation device 100, by the operational object displacement detecting part 13, determines that the operator has lifted his finger off the touch panel and that a drag operation has been completed. Then the navigation device 100, by the route re-searching part 15, initiates a re-search of the recommended route between the anchor F1 and the anchor F2.

In this case, the route re-searching part 15 derives as a recommended route a route which passes through a point indicated by a coordinate position of the operational object P1 and minimizes a degree of deviation relative to a path T1. Then, the route re-searching part 15 displays the derived recommended route on the display device 5.

In an example, in order to derive a route which satisfies a requirement, the route re-searching part 15 may make the recommended route searching part 10 re-search a route after decreasing a link cost of a road which includes a point indicated by the coordinate position of the operational object P1.

In addition, the navigation device 100 may notify the operator that the navigation device 100 is working properly through blinking or highlighting the path T1 by the path changing part 14 while the route re-searching part 15 is re-searching the recommended route.

Moreover, the navigation device 100 may metamorphose (morph) the path T1 drawn by the path changing part 14 into the shape of the modified route gradationally as a re-search of the modified route by the route re-searching part 15 progresses.

In this way, the navigation device 100 allows the operator to modify a recommended route through a more intuitive and simpler operation and through representations on a screen, without requiring the operator to confirm a desired route on a map or to trace the route, or without requiring the operator to designate a starting point, an ending point, a turning point, or the like repeatedly.

Figure 3A:
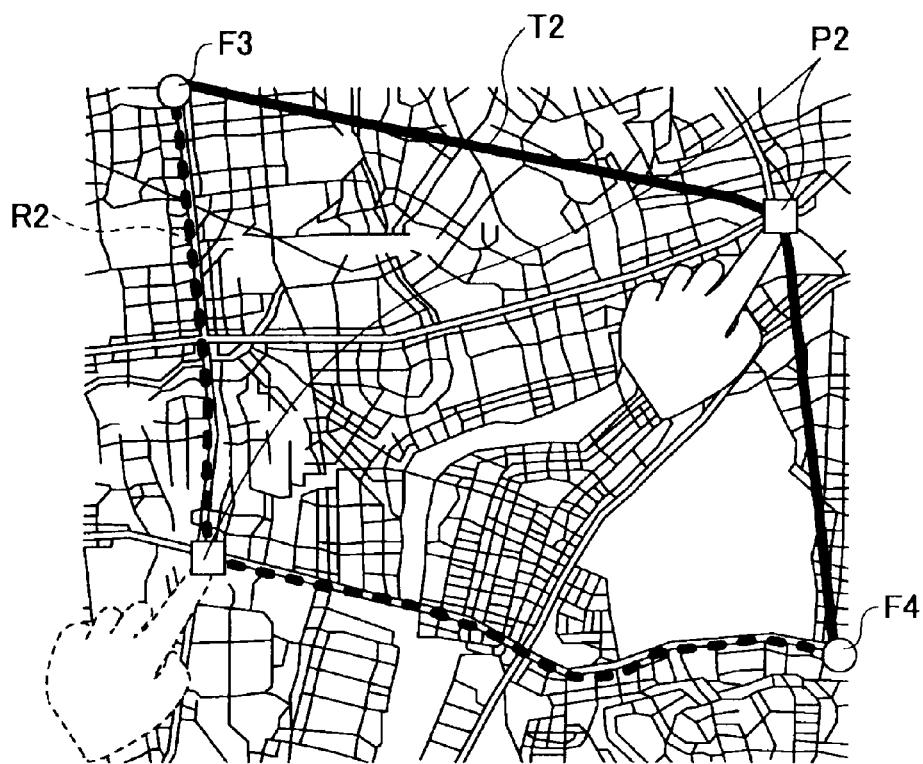
FIGS. 3A and 3B are illustrations of an operation procedure for avoiding a specific intersection.
Figure 3B:
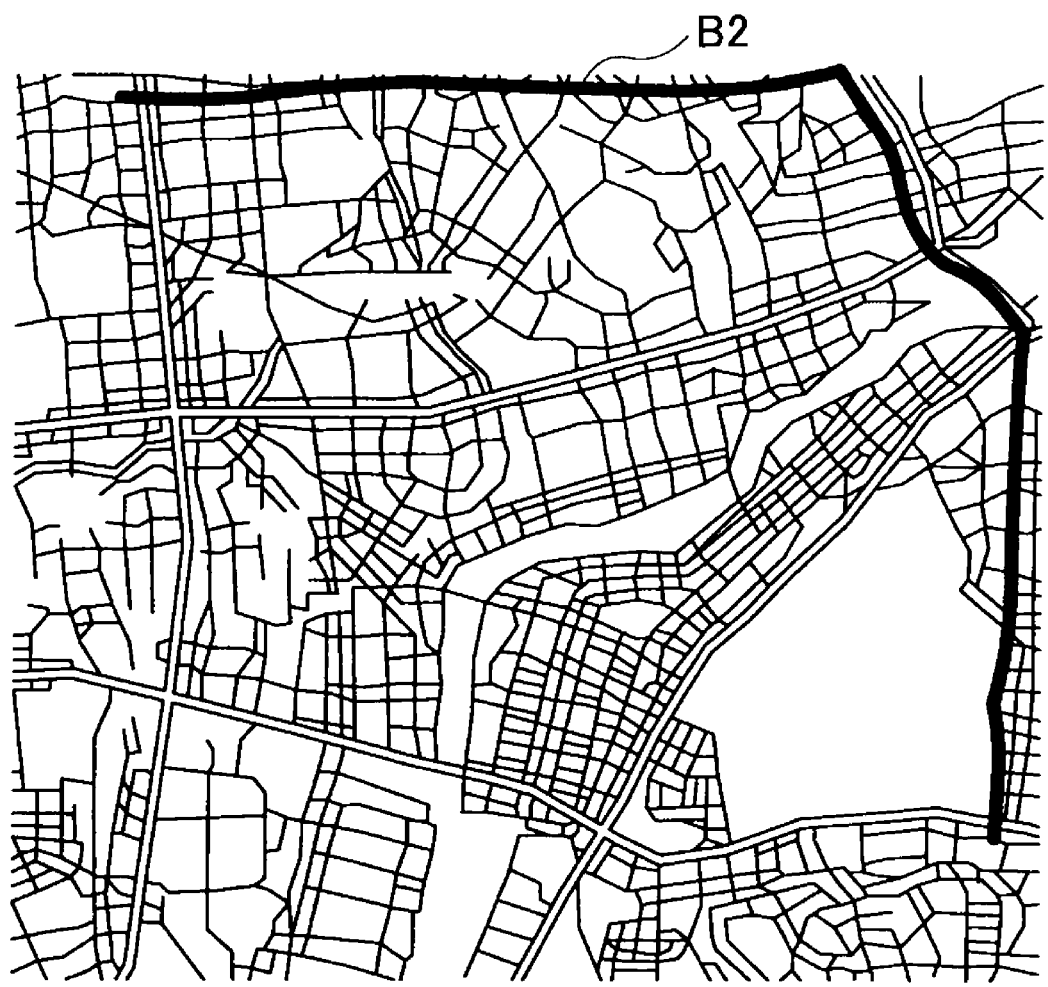
Figure 4A:
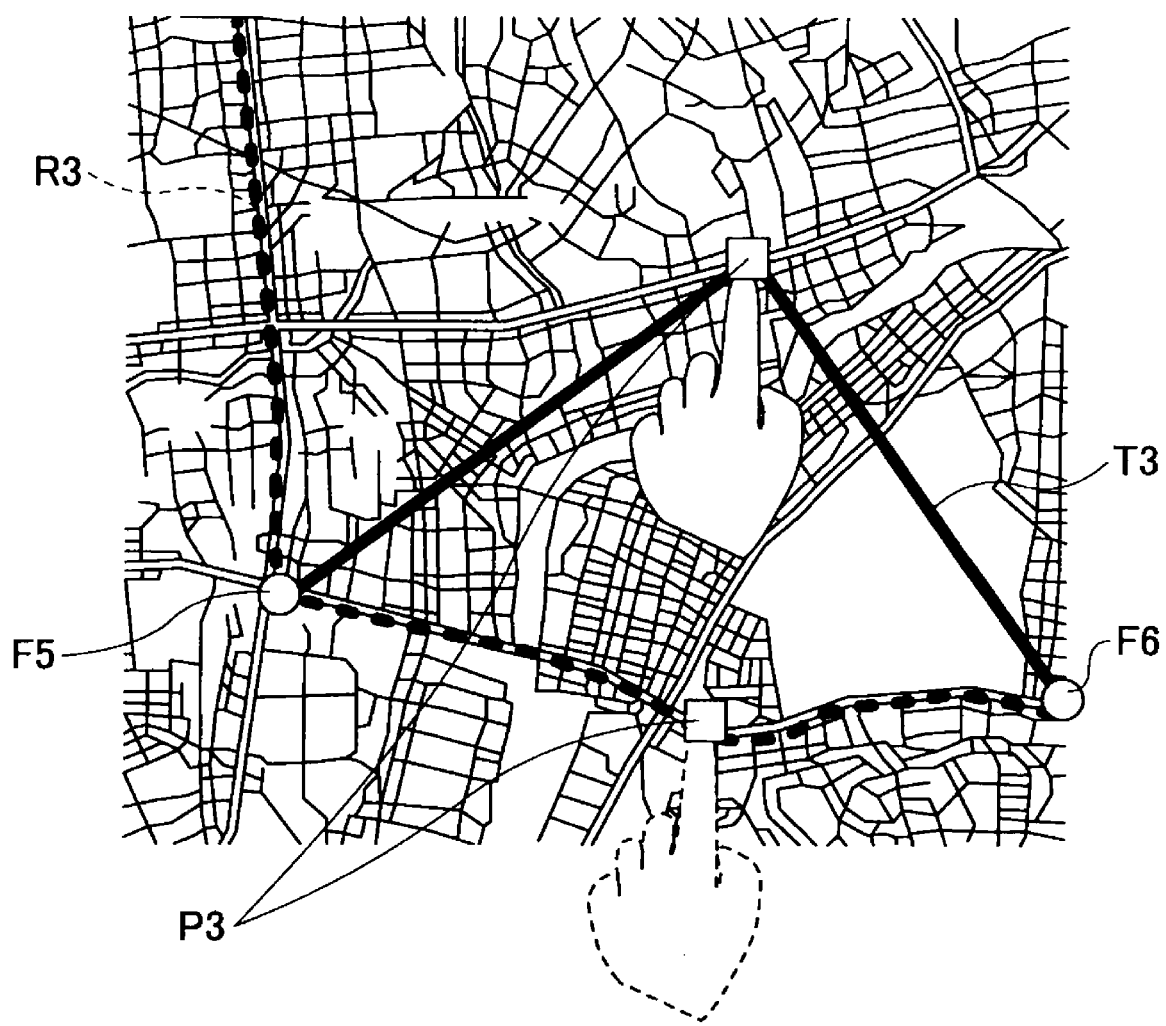
FIGS. 4A and 4B are illustrations of an operation procedure for including a specific road in a recommended route.
Figure 4B:

Next, with reference to FIGS. 3A, 3B, 4A, and 4B, a process by which the navigation device 100 re-searches a portion of a recommended route is explained. FIGS. 3A and 3B are illustrations of an operation procedure for avoiding a specific intersection. FIGS. 4A and 4B are illustrations of an operation procedure for incorporating a specific road into a recommended route.

FIG. 3A illustrates a state where after a route including an intersection to be avoided had been searched as a recommended route R2 by the recommended route searching part 10, an operator has selected (i.e. node-selected) through a touch-input the intersection to be avoided as an operational object P2, and the operator has moved the operational object P2 to another intersection in the upper right part of the screen through a drag operation.

FIG. 3B illustrates a modified route B2 derived by the route re-searching part 15 based on the coordinate position of the moved operational object P2.

It is to be noted that the fixed point setting part 12 sets as anchors edge points F3 and F4 of the recommended route R2 on the screen (currently displayed screen) of the display device 5. This is because there is no other point such as a departure point, a destination point, or a turning point, which is adjacent to the operational object P2.

In this case, the path changing part 14 displays the path T2 on the display device 5 while elongating or contracting a straight line between the operational object P2 and the anchor F3 and a straight line between the operational object P2 and the anchor F4 gradationally in conjunction with the movement of the operational object P2 to the upper right part of the screen through the drag operation.

In addition, the route re-searching part 15 derives as a modified route a route which includes points indicated by the anchor F3, the anchor F4, and the operational object P2, and minimizes a degree of deviation relative to the path T2.

In this way, the navigation device 100 derives the modified route avoiding a specific intersection more intuitively while allowing an operator to imagine an outline of the modified route B2 to be derived by the route re-searching part 15 through allowing the operator to accurately select an intersection to be avoided as the operational object P2 and through displaying the path T2 in conjunction with the movement of the operational object P2.

FIG. 4A illustrates a state where after a route not including a route through which the operator desires to pass had been searched as a recommended route R3 by the recommended route searching part 10, an operator has selected (i.e. link-selected) through a touch-input a point on the route not including the route through which the operator desires to pass as an operational object P3, and the operator has moved the operational object P3 to a point on a route through which the operator desires to pass at an upper part of the screen through a drag operation.

FIG. 4B illustrates a modified route B3 derived by the route re-searching part 15 based on the coordinate position of the moved operational object P3.

It is to be noted that the fixed point setting part 12 sets as anchors a turning point F5 adjacent to the operational object P3 and an edge point F6 of the recommended route R3 on the screen (currently displayed screen) of the display device 5. This is because there exists the turning point F5 on the recommended route R3 on a left side (a first direction) of the operational object P3 whereas there is no other point such as a departure point, a destination point, or a turning point on the recommended route R3 on a right side (a second direction) of the operational object P3.

In this case, the path changing part 14 displays the path T3 on the display device 5 while elongating or contracting a straight line between the operational object P3 and the anchor F5 and a straight line between the operational object P3 and the anchor F6 gradationally in conjunction with the movement of the operational object P3 to the upper part of the screen through the drag operation.

In this way, the navigation device 100 derives the modified route including the route through which the operator desires to pass more intuitively while allowing the operator to imagine an outline of the modified route B3 to be derived by the route re-searching part 15 through allowing the operator to select an arbitrary point on a road (a link) included in the recommended route R3 as the operational object P3 and through displaying the path T3 in conjunction with the movement of the operational object P3.

In addition, since the navigation device 100 not only allows an operator to select and move a predetermined point on a recommended route (such as an intersection, a T-intersection, a Y-intersection, or the like) but also allows the operator to modify the recommended route by selecting and moving an arbitrary point on the recommended route, without requiring an operator to select the predetermined point precisely, the navigation device 100 provides a function to modify the recommended route through a more intuitive and simpler operation and through representations on a screen not only to an operator who recognizes a portion to be avoided as a point (see FIG. 3A and FIG. 3B) but also to an operator who recognizes a portion to be avoided as a region.

In addition, as shown in FIG. 4B, the modified route derived by the route re-searching part 15 does not include a point indicated by the anchor F5. In this regard, if the route re-searching part 15 determines that a route including a point indicated by the anchor F5 is unnatural due to a travel distance, a drive time, the number of turns, or the like, the route re-searching part 15 may derive as a modified route a route which does not pass through the point indicated by the anchor F5.

Figure 5A:
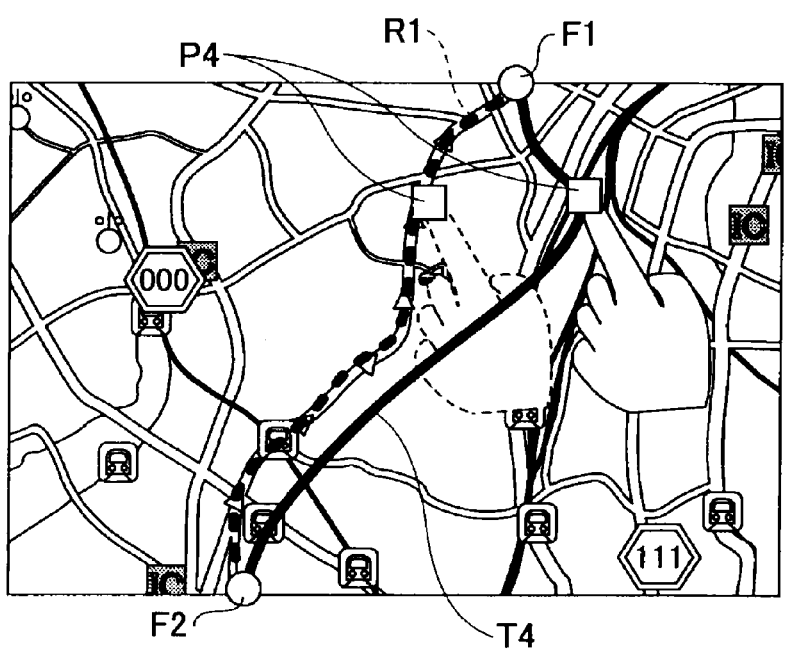
FIGS. 5A and 5B are illustrations of a path changing method displacing a plurality of operational objects in sequence.
Figure 5B:
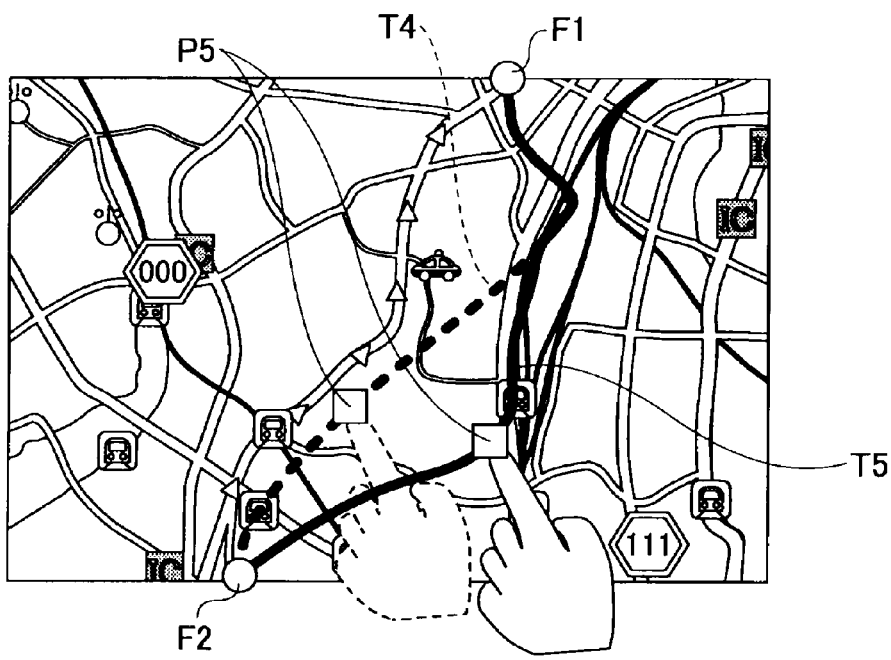
Figure 6:
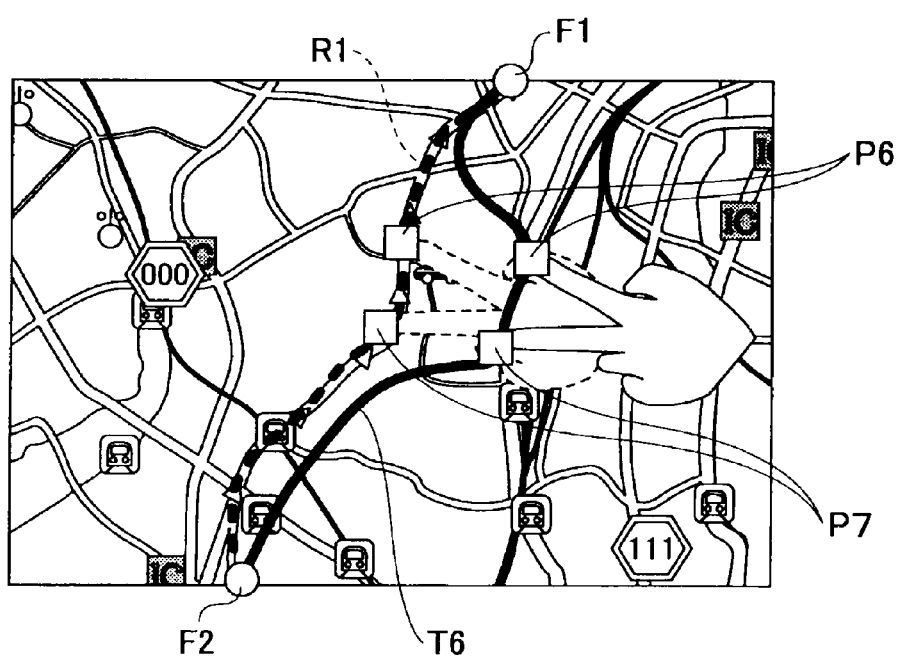
FIG. 6 is a diagram illustrating a path changing method displacing a plurality of operational objects simultaneously.

Next, with reference to FIGS. 5A, 5B, and 6, another method for changing a path by the path changing part 14 is explained. FIGS. 5A and 5B are illustrations of a method for changing a path gradationally by moving a plurality of operational objects in sequence. FIG. 6 is an illustration of a method for changing a path quickly by moving a plurality of operational objects simultaneously.

It will be assumed that the recommended route R1 shown in FIG. 2A is utilized as the recommended routes in FIGS. 5 and 6, and that the modified route B1 shown in FIG. 2C is derived as the modified routes in FIGS. 5 and 6.

FIG. 5A illustrates a state where the navigation device 100 allows an operator to select a point on the recommended route R1 as an operational object P4 through a touch-input and to move the selected operational object P4 to the right part of a screen through a drag operation, and displays a path T4 in conjunction with the movement of the operational object P4.

FIG. 5B illustrates a state where the navigation device 100 allows an operator to select a point on the path T4 through another touch-input as an operational object P5 within a predetermined time period (for example 3 seconds) after the previous drag operation, and to move the selected operational object P5 to the right part of the screen through another drag operation, and displays a path T5 in conjunction with the movement of the operational object P5.

In this way, the navigation device 100 quickly derives a modified route closer to the desire of the operator, because the navigation device 100 gradationally changes a path between the anchor F1 and the anchor F2 while allowing the operator to select and drag a plurality of operational objects in sequence within a short time period, and initiates a re-search of a modified route if the shape of the path roughly meets the satisfaction of the operator (for example, in the case where the operator allows the predetermined time period to expire without an operation).

FIG. 6 illustrates a state where the navigation device 100 allows an operator to select two points on the recommended route R1 through a touch-input as operational objects P6 and P7 simultaneously and to move the selected operational objects P6 and P7 through a drag operation to the right part of a screen simultaneously, and displays a path T6 in conjunction with the movement of the operational objects P6 and P7.

In this way, since the navigation device 100 allows the operator to select a plurality of operational objects simultaneously and to change the path between the anchor F1 and the anchor F2, and initiates a re-search of a modified route when the shape of the changed path roughly meets the satisfaction of the operator (for example, in the case where the operator lifts his two fingers off the touch panel), the navigation device 100 can allow the operator to shape a more desirable path more quickly and flexibly in comparison with the case of moving only a single operational object or moving a plurality of operational objects in sequence.

By having the above-mentioned configuration, since the navigation device 100 shows an operator an outline of a modified route while changing a path connecting anchors and an operational object in conjunction with the movement of the operational object until the navigation device 100 re-searches and determines the modified route, the navigation device 100 can allow the operator to modify a recommended route while leading the operator to understand a relationship between a drag operation by the operator and its effect intuitively.

In addition, since the navigation device 100 changes a path connecting anchors and an operational object in conjunction with a movement of the operational object, the navigation device 100 can allow the operator to recognize easily and certainly that the navigation device 100 is working properly and provide the operator a sense of security.

Moreover, since the navigation device 100 enables a modification of a recommended route simply by changing a path of the recommended route through a drag operation, the navigation device 100 neither requires a complicated arithmetic processing by a dedicated input device or software nor requires an increase in cost.

Furthermore, since the navigation device 100, by the fixed point setting part 12, selects as anchors two points which sandwich an operational object therebetween out of a turning point, a destination point, a departure point, an edge point of a recommended route displayed on a screen, or the like, the navigation device 100 can avoid setting an anchor at a meaningless position and deriving a complicated modified route with many turning points or an unnatural modified route ignoring a travel distance, a drive time, a roadway width, or the like.

[Additional Statement]

Although the present invention has been described above with respect to preferable embodiments, the present invention is not to be thus limited, and the above-described embodiments are to receive various modifications and substitutions without departing from the scope of the present invention.

For example, in the embodiments above, although the navigation device 100, by the path changing part 14, displays continuously a path which connects an operational object and anchors with a straight line or a curved line in conjunction with a movement of the operational object, the navigation device 100 may display sequentially and continuously a modified route re-searched by the route re-searching part 15 in real time in conjunction with a movement of the operational object.

In addition, in the embodiments above, although the navigation device 100 allows an operator to select or drag an operational object with his finger or via a stylus pen (in the case of a touch panel) or via a cursor (in the case of a mouse, a joystick, or the like), the navigation device 100 can allow the operator to manipulate a graphic image having a predetermined profile such as a circle, a rectangle, a triangle, or the like on a screen of the display device 5 and allow the operator to reshape a path of a recommended route by bringing the profile of the graphic image into contact with the recommended route.

Moreover, in the embodiments above, although the navigation device 100 accepts a touch-input or a drag operation by an operator through a touch panel, the navigation device 100 may accept a touch-input or a drag operation by an operator through a mouse or a remote control with an arrow key.

Furthermore, the navigation device 100 may adjust a degree of change of a path depending on a moving speed of an operational object during a drag operation or a press force on a touch panel during a drag operation. For example, the navigation device 100 may increase a deviation from a recommended route at a path portion close to a coordinate position of the operational object as the moving speed gets higher or as the press force gets higher.

The present application claims priority from Japanese Patent Application No. 2007-079712 filed on Mar. 26, 2007, which is incorporated herein by reference.

The invention claimed is:

1. A navigation device having a function to modify a route comprising:
   an operational object detecting part configured to detect a point or a section on the route as an operational object;
   an operational object displacement detecting part configured to detect a displacement of the operational object;
   a path changing part configured to change a path of the route depending on the displacement of the operational object in real time, the path being tentative prior to recommending a navigable route; and
   a route re-searching part configured to re-search an alternate route based on the changed path, wherein
   after the path changing part has changed the path and prior to the route re-searching part re-searches the alternate route, the operational object detecting part is configured to detect another operational object within a predetermined time period,
   if the another operational object is detected within the predetermined time period and displaced, the path changing part is configured to further change the path depending on the displacement of the another operational object in real time and prior to the re-search of the alternate route based on the further changed path, and
   if the another operation object is not detected within the predetermined time period, the alternate route is re-searched based on the changed path.

2. A navigation device according to claim 1, further comprising:
   a fixed point setting part configured to set as fixed points two points on the route sandwiching the operational object therebetween,
   wherein the path changing part elongates or contracts a line connecting the operational object and the fixed point in conjunction with the displacement of the operational object.

3. A navigation device according to claim 2, wherein the fixed point includes a departure point, a destination point, an edge point of the route displayed on a screen, or a turning point on the route.

4. A navigation device according to claim 1, wherein the operational object is designated by one or more points on the route.

5. A navigation device according to claim 1, wherein the operational object displacement detecting part detects the displacement of the operational object based on a drag operation of the operational object.

6. A navigation device according to claim 1, comprising at least one of a touch panel, a touch pad, a mouse, a track ball, a joystick, or a remote control with an arrow key.

7. A navigation device according to claim 1, wherein the path changing part changes and displays a path of the route in real time depending on the displacements of the operational objects, continuously, the path being tentative prior to recommending a navigable route.

8. A navigation device having a function to modify a route comprising:
   an operational object detecting part configured to detect a point or a section outside the route as an operational object;
   a fixed point setting part configured to set as fixed points two points on the route sandwiching the operational objects detected by the operational object detecting part therebetween;
   a path changing part configured to change a path of the route to a changed path including the operational objects and the two fixed points and display the changed path, the path being tentative prior to recommending a navigable route; and
   a route re-searching part configured to re-search and display an alternate route based on the changed path, wherein
   after the path changing part has changed the path and prior to the route re-searching part re-searches the alternate route, the operational object detecting part is configured to detect another operational object within a predetermined time period,
   if the another operational object is detected within the predetermined time period and displaced, the path changing part is configured to further change the path depending on the displacement of the another operational object in real time and prior to the re-search of the alternate route based on the further changed path, and
   if the another operation object is not detected within the predetermined time period, the alternate route is re-searched based on the changed path.

* * * * *